United States Patent
Kwak et al.

(10) Patent No.: US 10,333,681 B2
(45) Date of Patent: Jun. 25, 2019

(54) APPARATUS AND METHOD FOR TRANSCEIVING CHANNEL STATE INFORMATION

(71) Applicant: Samsung Electronics Co., Ltd., Suwon-si, Gyeonggi-do (KR)

(72) Inventors: Youngwoo Kwak, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 15/625,338

(22) Filed: Jun. 16, 2017

(65) Prior Publication Data

US 2017/0366325 A1  Dec. 21, 2017

(30) Foreign Application Priority Data

Jun. 16, 2016  (KR) .................. 10-2016-0074957

(51) Int. Cl.
*H04W 72/04* (2009.01)
*H04B 7/06* (2006.01)
*H04L 5/00* (2006.01)
*H04L 1/00* (2006.01)
*H04L 1/18* (2006.01)

(52) U.S. Cl.
CPC ......... *H04L 5/0057* (2013.01); *H04B 7/0626* (2013.01); *H04L 1/0003* (2013.01); *H04L 1/0009* (2013.01); *H04L 1/0025* (2013.01); *H04L 1/0031* (2013.01);
(Continued)

(58) Field of Classification Search
None
See application file for complete search history.

(56) References Cited

U.S. PATENT DOCUMENTS

2013/0083758 A1* 4/2013 Kim .................. H04L 25/00 370/329
2013/0114656 A1* 5/2013 Sayana .................. H04B 7/024 375/219

(Continued)

FOREIGN PATENT DOCUMENTS

WO  2015093829 A1  6/2015
WO  2016039604 A1  3/2016

OTHER PUBLICATIONS

Samsung, 'Discussions on open and semi-open loop transmission in eFD-MIM0', R1-164784, 3GPP TSG RAN WG1 #85, Nanjing, China, May 14, 2016.

*Primary Examiner* — Edan Orgad
*Assistant Examiner* — Emmanuel K Maglo
(74) *Attorney, Agent, or Firm* — Jefferson IP Law, LLP

(57) ABSTRACT

A method of an evolved Node B (eNB) in a wireless environment is provided. The method includes receiving, from a user equipment (UE), a plurality of channel state information (CSI) feedback respectively corresponding to a plurality of CSI processes that are respectively allocated a plurality of precoding matrix indexes (PMIs), determining a modulation and coding scheme (MCS) value based on the plurality of received CSI feedback, and transmitting, to the UE, data modulated based on the determined MCS value by cyclically using the plurality of PMIs, wherein the plurality of CSI feedback may each include information on a channel quality indication (CQI) as to a PMI allocated to a CSI process corresponding to each of the plurality of CSI feedback.

20 Claims, 12 Drawing Sheets

(52) U.S. Cl.
CPC ........... *H04L 5/0051* (2013.01); *H04W 72/04* (2013.01); *H04L 1/1896* (2013.01); *H04L 5/0048* (2013.01)

(56) References Cited

U.S. PATENT DOCUMENTS

| | | | | |
|---|---|---|---|---|
| 2013/0163537 | A1* | 6/2013 | Anderson | H04W 72/1284 370/329 |
| 2013/0208604 | A1* | 8/2013 | Lee | H04L 25/0226 370/252 |
| 2013/0336214 | A1 | 12/2013 | Sayana et al. | |
| 2014/0169300 | A1* | 6/2014 | Kim | H04L 5/0057 370/329 |
| 2014/0254701 | A1 | 9/2014 | Geirhofer et al. | |
| 2014/0269338 | A1* | 9/2014 | Jung | H04L 5/0055 370/241 |
| 2014/0301293 | A1* | 10/2014 | Geirhofer | H04B 7/0626 370/329 |
| 2014/0313985 | A1* | 10/2014 | Nimbalker | H04L 27/0012 370/329 |
| 2014/0314007 | A1* | 10/2014 | Chen | H04B 7/00 370/329 |
| 2014/0369292 | A1* | 12/2014 | Wu | H04W 72/04 370/329 |
| 2015/0230259 | A1* | 8/2015 | Park | H04B 7/0626 370/329 |
| 2015/0236773 | A1* | 8/2015 | Kim | H04B 7/0626 375/295 |
| 2015/0327287 | A1 | 11/2015 | Kim et al. | |
| 2016/0036571 | A1* | 2/2016 | Park | H04B 7/024 370/330 |
| 2016/0127936 | A1* | 5/2016 | Chatterjee | H04B 7/0626 370/252 |
| 2016/0156402 | A1* | 6/2016 | Hoshino | H04B 7/0452 375/267 |
| 2016/0330004 | A1* | 11/2016 | Kim | H04L 5/0048 |
| 2016/0344460 | A1* | 11/2016 | Frank | H04B 7/0478 |
| 2017/0134082 | A1* | 5/2017 | Onggosanusi | H04B 7/0478 |
| 2017/0149480 | A1* | 5/2017 | Kakishima | H04J 11/00 |

\* cited by examiner

APPARATUS AND METHOD FOR TRANSCEIVING CHANNEL STATE INFORMATION

CROSS-REFERENCE TO RELATED APPLICATION(S)

This application claims the priority under 35 U.S.C. § 119(a) of a Korean patent application filed on Jun. 16, 2016 in the Korean Intellectual Property Office and assigned Serial number 10-2016-0074957, the entire disclosure of which is hereby incorporated by reference.

TECHNICAL FIELD

The present disclosure relates to wireless communication. More particularly, the present disclosure relates to an apparatus and a method for transceiving channel state information in a wireless environment.

BACKGROUND

Multiple-input multiple-output (MIMO) technology for transmitting a plurality of information streams in a spatially separated manner is used for high-speed data transmission in a wireless environment. MIMO technology may be achieved through a closed-loop scheme or an open-loop scheme.

Various schemes for supporting higher mobility of a user equipment (UE) are developing to improve the convenience of users and the portability of a UE. For example, a semi-open-loop scheme is in development to guarantee higher mobility of a UE and to supplement the closed-loop (CL) scheme and the open-loop (OL) scheme.

To achieve the semi-open-loop scheme, a novel method for transceiving channel state information is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for transceiving channel state information for a semi-open-loop scheme in Multiple-input multiple-output (MIMO) technology.

In accordance with an aspect of the present disclosure, a method of an evolved Node B (eNB) in a wireless environment is provided. The method includes receiving, from a user equipment (UE), a plurality of channel state information (CSI) feedback respectively corresponding to a plurality of CSI processes that are respectively allocated a plurality of precoding matrix indexes (PMIs), determining a modulation and coding scheme (MCS) value based on the plurality of received CSI feedback; and transmitting, to the UE, data modulated based on the determined MCS value by cyclically using the plurality of PMIs. The plurality of CSI feedback each includes information on a channel quality indication (CQI) as to a PMI allocated to a CSI process corresponding to each of the plurality of CSI feedback.

In accordance with another aspect of the present disclosure, an apparatus of an eNB in a wireless environment is provided. The apparatus includes at least one processor and at least one transceiver configured to be operatively coupled to the at least one processor. The at least one processor is configured to receive, from a UE, a plurality of CSI feedback respectively corresponding to a plurality of CSI processes that are respectively allocated a plurality of PMIs, determine an MCS value based on the plurality of received CSI feedback, and transmit, to the UE, data modulated based on the determined MCS value by cyclically using the plurality of PMIs. The plurality of CSI feedback each includes information on a CQI as to a PMI allocated to a CSI process corresponding to each of the plurality of CSI feedback.

In accordance with another aspect of the present disclosure, a method of a UE in a wireless environment is provided. The method includes transmitting, to an eNB, a plurality of CSI feedback respectively corresponding to a plurality of CSI processes that are respectively allocated a plurality of PMIs and receiving, from the eNB, data transmitted by cyclically using the plurality of PMIs. The plurality of CSI feedback each includes information on a CQI as to a PMI allocated to a CSI process corresponding to each of the plurality of CSI feedback. The data transmitted from the eNB is modulated based on an MCS value determined based on the plurality of CSI feedback.

In accordance with another aspect of the present disclosure, an apparatus of a UE in a wireless environment is provided. The apparatus includes, at least one processor and at least one transceiver configured to be operatively coupled to the at least one processor. The at least one processor is configured to transmit, to an eNB, a plurality of CSI feedback respectively corresponding to a plurality of CSI processes that are respectively allocated a plurality of PMIs, and receive, from the eNB, data transmitted by cyclically using the plurality of PMIs. The plurality of CSI feedback each includes information on a CQI as to a PMI allocated to a CSI process corresponding to each of the plurality of CSI feedback. The data transmitted from the eNB is modulated based on an MCS value determined based on the plurality of CSI feedback.

An apparatus and a method according to various embodiments of the present disclosure may implement a semi-open-loop scheme for multiple input, multiple output (MIMO) by transceiving a CSI feedback corresponding to a CSI process that is allocated a PMI and including CQI information on the PMI.

Effects which can be acquired by the present disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
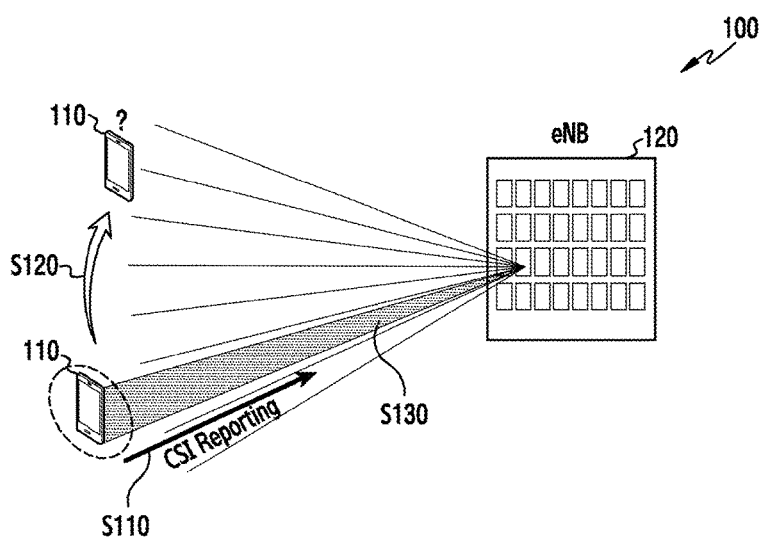
FIG. 1A illustrates an example of a closed-loop (CL) multiple-input multiple-output (MIMO) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

The present disclosure relates to an apparatus and method for transceiving channel state information in order to provide a semi-open-loop scheme in a multiple-input-multiple-output (MIMO) system.

As used in the present disclosure, terms to represent control information, terms to represent network entities, terms to represent messages, terms to represent components in an apparatus, and the like are provided for convenience of description. Therefore, the present disclosure is not limited by the following terms, and other terms having equivalent technical meanings may be applied to the present disclosure.

Although the present disclosure illustrates various embodiments using a long term evolution (LTE) system and an LTE-advanced (LTE-A) system, these embodiments are merely examples for description. Various embodiments of the present disclosure may be easily modified and applied in other communication systems.

MIMO systems may be classified into a closed-loop (CL) MIMO system and an open-loop (OL) MIMO system depending on whether a transmitter receives information on a precoding matrix index (PMI) from a receiver when generating a transmission beam pattern.

In the OL MIMO system, the receiver may transmit, to the transmitter, channel quality indication (CQI) information including a CQI index indicating a modulation scheme (for example, quadrature phase shift keying (QPSK), 16-quadrature amplitude modulation (16-QAM), and the like), a code rate, and the like based on time and frequency resources and a precoding assumed by specifications.

In the CL MIMO system, the receiver may transmit a PMI feedback including information on a PMI preferred by the receiver to the transmitter. When the PMI feedback is received, the transmitter may transmit a signal to the receiver using a transceiving precoding determined based on the PMI feedback.

Generally, since a precoding can be selected based on the information on the PMI preferred by the receiver, the CL MIMO system may have more efficient system performance than the OL MIMO system.

However, the CL MIMO system requires additional overheads, such as a process for the receiver to transmit the PMI feedback to the transmitter. Further, the CL MIMO system may have performance loss when the receiver moves at a very high speed or when a channel between the transmitter and the receiver significantly changes.

The OL MIMO system may be inferior in system performance to the CL MIMO system but may be robust to the impact of dynamic interference. Also, the OL MIMO system does not require additional overhead, such as a process of transmitting a PMI feedback.

Accordingly, a semi-OL MIMO system capable of combining advantages of the OL MIMO system with advantages of the CL MIMO system has emerged. The semi-OL MIMO system includes a receiver to report part of PMI information to a transmitter. The transmitter determines approximate directional information for the receiver based on the received part of PMI information and transmits data by cyclically using a plurality of precoders corresponding to the determined approximate directional information. The receiver included in the semi-OL MIMO system may have small overheads, as compared with the CL MIMO system, through transmission of the part of the PMI information. The transmitter included in the semi-OL MIMO system may provide the receiver with higher-performance spatial multiplexing than the OL MIMO system. Further, the transmitter included in the semi-OL MIMO system may have a higher diversity gain than the CL MIMO system and may be more robust to dynamic interference than the CL MIMO system.

The semi-OL MIMO system with the above-mentioned advantages requires new-format procedures for the semi-OL MIMO system. The new-format procedures may be easily implemented in a device designed for the semi-OL MIMO system (for example, a user equipment (UE), an evolved Node B (eNB), and the like). However, the semi-OL MIMO system may not be efficiently implemented in a device designed without considering the semi-OL MIMO system.

Accordingly, the present disclosure provides a method for enabling a device, designed without considering a semi-OL MIMO system, to implement the semi-OL MIMO system. More particularly, the present disclosure provides an apparatus and a method for efficiently implementing the semi-OL MIMO systems through a Channel State information (CSI) feedback generated using a CSI process of an existing LTE or LTE-A system, codebook subset restrictions, and the like.

FIG. 1A illustrates an example of a CL MIMO system according to an embodiment of the present disclosure.

Referring to FIG. 1A, the CL MIMO system 100 may include a UE 110 and an eNB 120.

In operation S110, the UE 110 may report CSI on a channel between the UE 110 and the eNB 120 to the eNB 120. The reported CSI may be information generated based on a reference signal transmitted from the eNB 120. The reported CSI may include PMI information indicating a beam preferred by the UE 110.

After reporting the CSI including the PMI information indicating the beam preferred by the UE 110 to the eNB 120, the UE 110 may move to a different area in operation S120.

After the UE 110 moves to the different area, the eNB 120 may transmit data to the UE through a beam determined based on the received PMI information in operation S130. However, since the UE 110 has moved to the different area from an area where the UE 110 reported the CSI, the beam determined by the eNB 120 may not be the beam preferred by the UE 110 located in the different area. That is, since the beam determined by the eNB 120 is not an optimal beam for the UE 110 located in the different area, the UE 110 may not efficiently receive data transmitted from the eNB 120.

As described above, the CL MIMO system 100 may provide an optimal beam to the UE 110 at the time when the UE 110 reports the CSI but may not supplement the mobility of the UE 110. Therefore, a semi-OL MIMO system may be required to supplement the mobility of the UE 110 or the like.

Figure 1B:
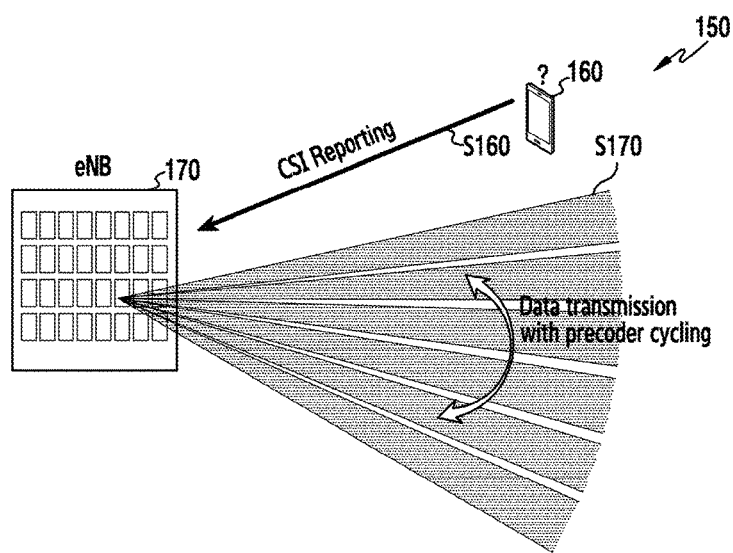
FIG. 1B illustrates an example of an open-loop (OL) MIMO system according to an embodiment of the present disclosure.

FIG. 1B illustrates an example of an OL MIMO system according to an embodiment of the present disclosure.

Referring to FIG. 1B, the OL MIMO system 150 may include a UE 160 and an eNB 170.

In operation S160, the UE 160 may report CSI on a channel between the UE 160 and the eNB 170 to the eNB 170. The reported CSI may be information generated based on a reference signal transmitted from the eNB 170. The reported CSI may not explicitly include PMI information indicating a beam preferred by the UE 160. The reported CSI includes only a CQI index indicating a modulation scheme, a code rate, and the like based on time and frequency resources and a precoding assumed by specifications and does not include the PMI information indicating the preferred beam. When the CSI is received, the eNB 170 may estimate at least one beam preferred by the UE 160 based on the reported CSI.

In operation S170, the eNB 170 may transmit data to the UE 160 by cyclically using the estimated at least one beam. The at least one beam is cyclically used for a diversity gain but is not a beam explicitly selected for the UE 160. Thus, the at least one beam may not be the best beam for the UE 160. That is, the UE 160 may not efficiently receive the data transmitted from the eNB 170.

As described above, the OL MIMO system 150 may provide a beam that is unsuitable for the UE 160. Thus, a semi-OL MIMO system, which has less overhead than the CL MIMO system 100 but is capable of supplementing the OL MIMO system 150, may be required.

Figure 2:
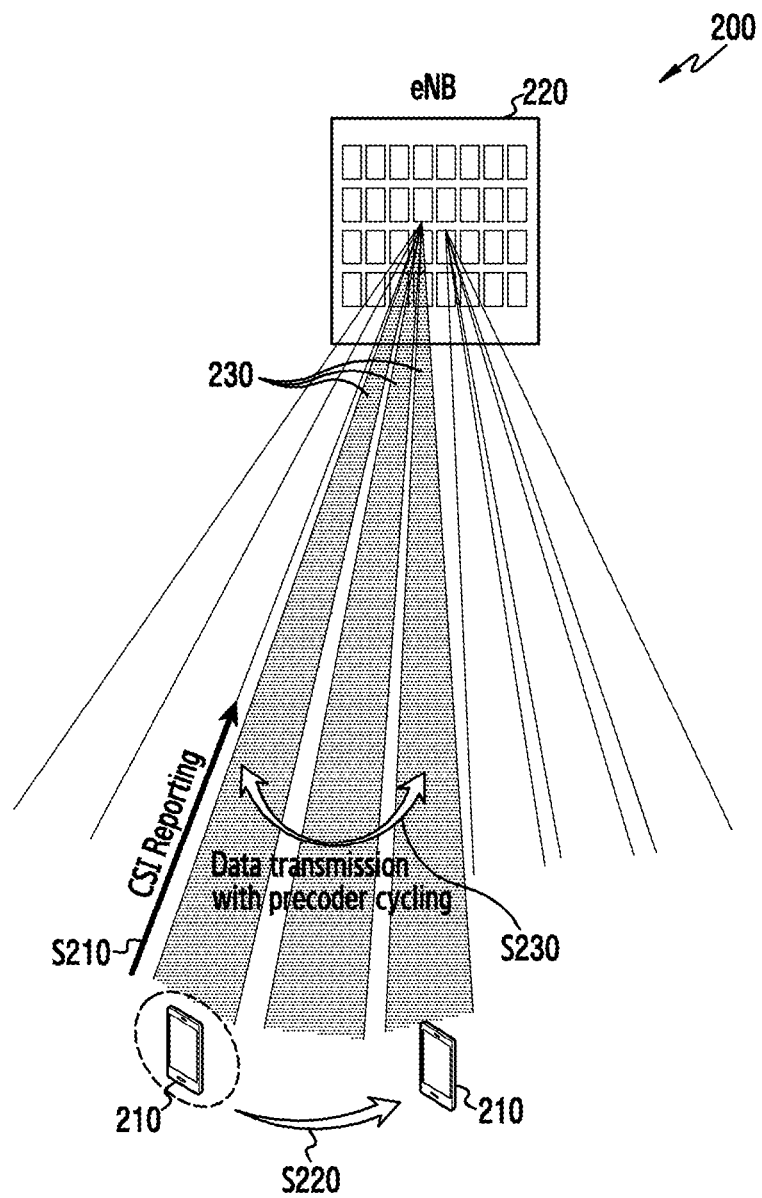
FIG. 2 illustrates an example of a semi-OL MIMO system according to various embodiments of the present disclosure.

FIG. 2 illustrates an example of a semi-OL MIMO system according to various embodiments of the present disclosure.

Referring to FIG. 2, the semi-OL MIMO system 200 may include a UE 210 and an eNB 220.

The UE 210 may be a device capable of communicating with different peers. The UE 210 may be a device with mobility. For example, the UE 210 may be a mobile phone, a smart phone, a music player, a portable game console, a navigation system, a laptop computer, or the like. The UE 210 may also be referred to as a mobile station, a terminal, a station (STA), or the like.

The UE 210 may be located within the coverage of the eNB 220. Also, the UE 210 may be provided with a communication service from the eNB 220. For example, the UE 210 may receive control information from the eNB 220. For another example, the UE 210 may transmit data to a different peer via the eNB 220. For still another example, the UE 210 may receive data provided from a server through the eNB 220.

The UE 210 may receive data or control information through a transmission beam of the eNB 220. In some embodiments, the UE 210 may receive data or control information transmitted from the eNB 220 through a reception beam of the UE 210. In other embodiments, the UE 210 may transmit data or control information to the eNB 220 through a transmission beam of the UE 210.

The UE 210 may periodically and/or aperiodically report state information on a current channel between the eNB and the UE 210 to the eNB 220 in order to help the eNB 220 with efficient management of a wireless communication system.

The eNB 220 may provide a wireless service to the UE 210.

The eNB 220 may simultaneously transmit multiple data streams for a broadcast service, a multicast service, and/or a unicast service.

The eNB 220 may include at least one cell. The at least one cell is set to one of bandwidths of 1.4 (or 1.25), 3 (or 2.5), 5, 10, 15, and 20 megahertz (MHz), and may provide a downlink or uplink transmission service to the UE 210. Different cells may be set to provide different bandwidths. The eNB 220 may control data transmission/reception to/from the UE 210. For example, for downlink data, the eNB 220 may transmit downlink scheduling information to the UE 210, thereby providing time/frequency regions for transmitting the downlink data, coding, the size of the downlink data, hybrid automatic repeat and request (HARQ)-related information, and the like.

The eNB 220 may be a fixed device. For example, the eNB 220 may also be referred to as a base station, an access point, or the like.

The eNB 220 may transmit a reference signal to the UE 210 so that the UE 210 may recognize the state of a channel between the UE 210 and the eNB 220. In some embodiments, the reference signal may be a channel state information reference signal (CSI-RS). In other embodiments, the reference signal may be a cell-specific reference signal (CRS).

In operation S210, the UE 210 may report, to the eNB 220, CSI generated based on a CSI-RS received from the eNB 220. The CSI may include rank indicator (RI) information, PMI information, and CQI information.

The RI information included in the CSI, which is reported to the eNB 220, may be information indicating the rank of a channel between the UE 210 and the eNB 220. Also, the RI information may indicate the number of streams the UE 210 is allowed to receive through the same frequency-time resource. The RI information may be determined based on long-term information and may be fed back to the eNB 220 at periodicity generally longer than the PMI information and the CQI information.

The PMI information included in the CSI, which is reported to the eNB 220, may include PMI information that is simple as compared with normal PMI information (for example, PMI information used in the CL MIMO system 100). The simple PMI information may be information indicating an approximate direction of an area where the UE 210 is located. For example, the simple PMI information may include information indicating a beam group including at least one beam preferred by the UE 210 (for example, a first PMI value i1 or some of the first PMI value and a second PMI value in a dual structure codebook defined in LTE TS 36.213).

The CQI information included in the CSI, which is reported to the eNB 220, may indicate a modulation and a coding rate in which a block error probability does not exceed 10% when the eNB 220 uses the reported RI and PMI information. The eNB 220 may indicate the Signal-to-Interference-plus-Noise-Ratio (SINR) of a channel between the eNB and the UE based on the CQI information.

After the UE 210 reports the CSI including the simple PMI information to the eNB 220, the UE 210 may move to a different area in operation S220.

After the UE 210 moves to the different area, the eNB 220 may transmit data to the UE 210 by cyclically using beams 230 determined based on the received simple PMI information in operation S230. The determined beams 230 may be beams included in one beam group. For example, when at least one determined beam 230 includes a first beam, a second beam, and a third beam, the eNB 220 may transmit the data to the UE 210 by cyclically using the first beam, the second beam, and the third beam. That is, the eNB 220 may transmit the data to the UE 210 based on precoder cycling.

Although the UE 210 has moved to the different area in operation S220, the UE 210 is located in the coverage of the at least one determined beam 230, so that the UE 210 may efficiently receive the data from the eNB 220.

As described above, the semi-OL MIMO system 200 may have less PMI reporting overhead than the CL MIMO system. Further, the semi-OL MIMO system 200 may compensate for a loss occurring when the UE 210 moves at a very high speed or when the channel between the UE 210 and the eNB 220 drastically changes.

However, when the UE 210 is not designated for the semi-OL MIMO system 200 (hereinafter, referred to as a legacy UE), the UE 210 may not efficiently use the semi-OL MIMO system 200. Specifically, when a legacy UE provides an eNB with a normal CSI feedback for a CL MIMO system or an OL MIMO system, precoder cycling performed by the eNB according to the semi-OL MIMO scheme, and the normal CSI feedback provided to the eNB may mismatch with actual data transmission. The normal CSI feedback may include one PMI and CQI information on one PMI per subband (SB). In some embodiments, the normal CSI feedback may be referred to as a normal CSI report. Such mismatch may be a term to indicate that a CQI as to a specific precoder included in the normal CSI feedback provided to the eNB does not correspond with a CQI as to a precoder used in the precoder cycling. When the mismatch arises, the eNB cannot help but transmit data to the legacy UE by modulating the data with relatively low transmission efficiency. Furthermore, since the legacy UE receives the data modulated with relatively low transmission efficiency from the eNB, the legacy UE may not use advantages of the semi-OL MIMO scheme described above.

Therefore, the present disclosure provides a method for the legacy UE to efficiently use a semi-OL MIMO system. Specifically, the present disclosure provides a multi-CSI feedback for a semi-OL system as a CSI feedback defined differently from a normal CSI feedback, for the semi-OL MIMO scheme. The multi-CSI feedback may include a plurality of CSI feedback corresponding to a plurality of CSI processes, or may also include a plurality of subframe sets corresponding to one or more CSI processes. The plurality of CSI feedback forming the multi-CSI feedback may each include information on a PMI assigned for a CSI process corresponding to each of the plurality of CSI feedback and CQI information on the PMI. In some embodiments, the multi-CSI feedback may also be referred to as a multi-CSI report. Detailed information on the multi-CSI feedback is provided in the following description.

Figure 3:
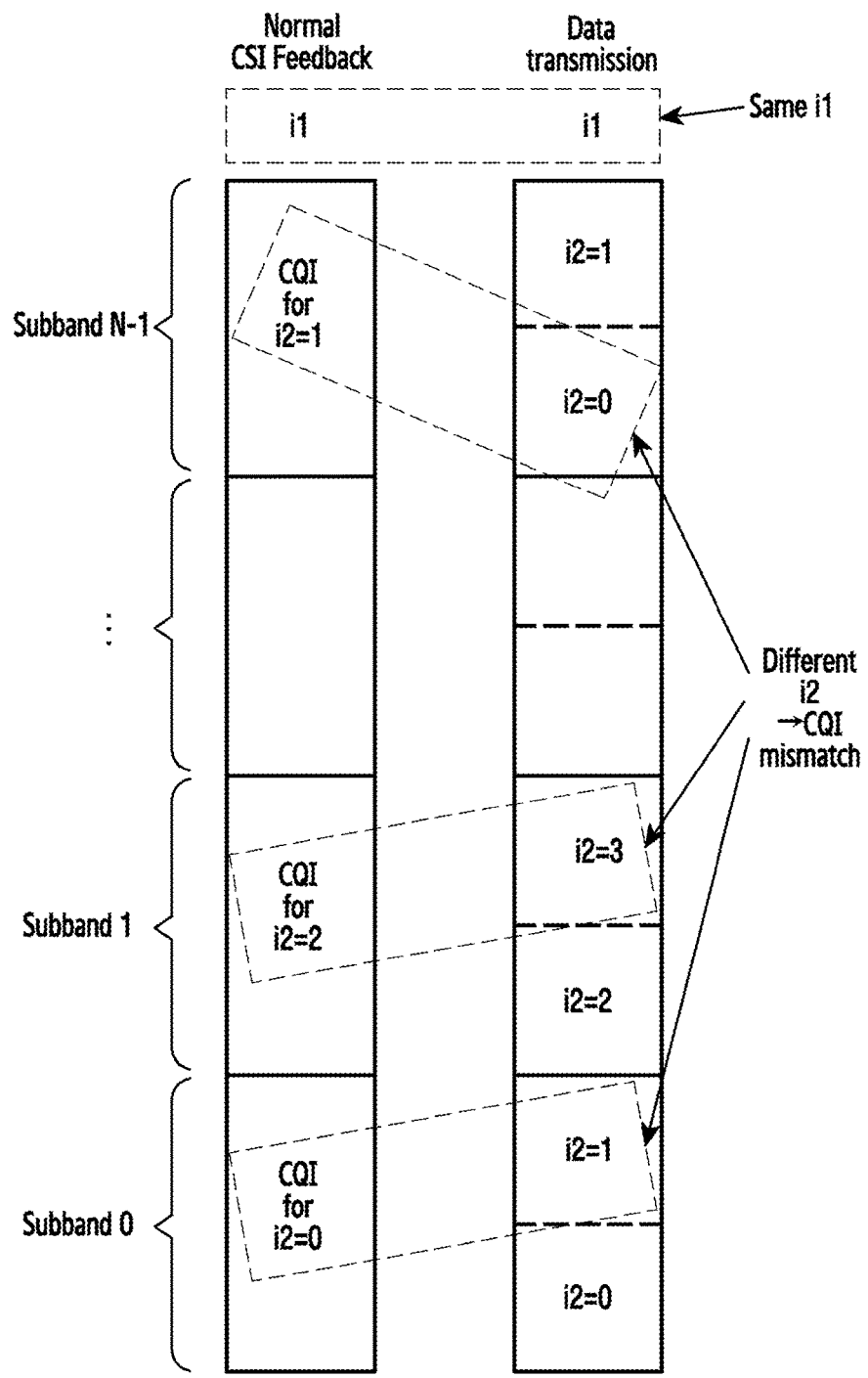
FIG. 3 illustrates an example of a mismatch between a normal channel state information (CSI) feedback and data transmission according to an embodiment of the present disclosure.

FIG. 3 illustrates an example of a mismatch between a normal CSI feedback and data transmission according to an embodiment of the present disclosure.

Referring to FIG. 3, i1 may be a factor indicating a precoding matrix W1. For example, i1 may be a first PMI value indicating one beam group among a plurality of beam groups. For another example, i1 may be a long-term PMI. For still another example, i1 may be a wideband (WB) PMI. For yet another example, i1 may be determined based on i1 for a first dimension or i1 and i2 for first and second dimensions in a two-dimensional (2D) antenna array.

i2 may be a second PMI value indicating a precoding matrix W2. For example, i2 may be a PMI indicating one of a plurality of beams in the beam group indicated by i1. For another example, i2 may be a short-term PMI. For still another example, i2 may be a subband (SB) PMI. For yet another example, i2 may be a PMI (that is, supporting quantized co-phasing) that is determined based on a phase difference between antenna groups having different polarizations of a cross-pol antenna.

An eNB may determine i1 indicating a beam group preferred by a UE according to the foregoing procedure. For example, in a Time Division Duplex (TDD) system, the eNB may determine i1 for a downlink channel through an uplink reference signal transmitted from the UE. For another example, even though an uplink band and a downlink band are positioned as different frequencies due to the use of a band adjacent to the uplink band as the downlink band, when the eNB is capable of identifying long-term channel information on the downlink band through an uplink reference signal, the eNB may determine i1 through an uplink reference signal transmitted from the UE. For still another example, the eNB may determine i1 through a CSI feedback including information on i1 received from the UE.

For the semi-OL MIMO scheme, the eNB may restrict some of a plurality of PMIs respectively indicating the plurality of beams in the beam group indicated by determined i1 to PMIs for a normal CSI feedback through codebook subset restrictions of higher-layer signaling. That is, in order to transmit data by cyclically using some beams in the beam group indicated by i1, the eNB may restrict information on PMIs to be included in the normal CSI feedback to PMI information on some cyclically used beams. For example, the UE may restrict i2=0, i2=1, i2=2, and i2=3, among the plurality of PMIs i2=0, i2=1, ..., i2=k, ..., i2=n−2, and i2=n−1 respectively indicating the plurality of beams in the beam group indicated by i1, to the PMIs for the normal CSI feedback.

The UE may transmit the normal CSI feedback including CQI information on the restricted PMIs to the eNB. The UE may transmit the normal CSI feedback in which CQI information on some restricted beams is divided for each subband to the eNB. For example, the UE may transmit, to the eNB, the normal CSI feedback including CQI information on i2=0 for subband 0, CQI information on i2=2 for subband 1, CQI information on i2=0 for subband 2, ..., and CQI information for i2=1 for subband N−1.

The eNB may receive the normal CSI feedback transmitted from the UE. Further, the eNB may transmit data to the UE by cyclically using some restricted beams in the beam group indicated by determined i1 according to a designated unit based on the semi-OL MIMO scheme. In some embodiments, the designated unit may be a physical resource block (PRB). In other embodiments, the designated unit may be a precoding resource block group (PRG).

The designated unit may vary according to a PMI report (PMI/RI reporting) setting. In transmitting a physical downlink shared channel (PDSCH), the UE receives information necessary for PDSCH decoding and demodulation reference signal (DMRS) estimation through downlink control information (DCI) using Table 1 below.

TABLE 1

Antenna port(s), scrambling identity, and number of layers indication

| One Codeword:<br>Codeword 0 enabled,<br>Codeword 1 disabled | | Two Codewords:<br>Codeword 0 enabled,<br>Codeword 1 enable | |
| --- | --- | --- | --- |
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In multi-user (MU)-MIMO according to the related art, up to two orthogonal transmission layers are support using 12 DMRS resource elements (REs) per PRB and an orthogonal cover code (OCC) of length 2 considering only antenna ports p=7 and 8. Further, up to four quasi-orthogonal transmission layers are supported using $n_{SCID}$. The eNB may indicate an antenna port, $n_{SCID}$, and the number of layers for transmitting a DMRS using three bits in DCI formats 2C and 2D as in Table 1. In Table 1, a first column shows a case in which a PDSCH is scheduled for transmission with one codeword, and a second column shows a case in which a PDSCH is scheduled for transmission with two codewords. In the first column, value=4/5/6 is used only for the retransmission of a corresponding codeword.

Thus, referring to Table 1, in MU-MIMO transmission, up to two orthogonal transmission layers may be supported, and up to four quasi-orthogonal transmission layers may be supported using $n_{SCID}$.

Accordingly, as described above, the UE may determine the number of layers allocated for PDSCH transmission, RE mapping, and a reference signal sequence based on DCI indicated by the eNB through Table 1, and may estimate a precoded channel, thereby decoding the PDSCH. That is, when no PMI/RI report is set, a corresponding DMRS may be decoded, assuming that the same precoding is always used only in one RB. When a PMI/RI report is set, decoding may be performed, assuming that the same precoding is used in one PRG. The size of a PRG unit varies according to a system bandwidth set for the UE and is shown in Table 2 below.

TABLE 2

| Size of PRG | |
| --- | --- |
| System Bandwidth<br>($N_{RB}^{DL}$) | PRG Size (P')<br>(PRBs) |
| ≤10 | 1 |
| 11-26 | 2 |
| 27-63 | 3 |
| 64-110 | 2 |

Therefore, when the PMI/RI report is set, the eNB may cyclically use precoders necessary for data transmission per PRG. When no PMI/RI report is set, the eNB may cyclically use precoders necessary for data transmission per PRB. When cycling is performed per PRG, the eNB may receive the PMI and RI reports to identify the direction of a corresponding channel but may have a limited diversity gain due to a large unit of cycling. When cycling is performed per PRB, the eNB may cyclically use a greater number of precoders due to a small unit of cycling, thus obtaining a greater diversity gain. However, since the UE does not provide information on the rank and direction of a channel, the eNB may need to identify such information through an uplink reference signal or the like.

For example, the eNB may transmit the data to the UE by cyclically using i2=0, i2=1, i2=2, and i2=3 respectively indicating some restricted beams for each PRB or PRG. The normal CSI feedback transmitted by the UE includes CQI information on i2=0 only and does not include CQI information on i2=1 with respect to subband 0. Also, the normal CSI feedback transmitted by the UE includes CQI information on i2=2 only and does not include CQI information on i2=3 with respect to subband 1. In addition, the normal CSI feedback transmitted by the UE includes CQI information on i2=1 only and does not include CQI information on i2=0 with respect to subband N−1. That is, the normal CSI feedback may cause a mismatch in subband 0, subband 1, subband N−1, and the like. Due to the mismatch, the eNB cannot help but estimate CQI information on i2=1 in subband 0, CQI information on i2=3 in subband 1, and CQI information on i2=0 in subband N−1. The estimated CQI information is only estimated information, which may be inaccurate information. Therefore, the eNB cannot help but transmit data modulated with a relatively low Modulation and Coding Scheme (MCS) value in subbands 0 to N−1. That is, the transmitted data inevitably has relatively low transmission efficiency.

As described above, when the UE transmits the normal CSI feedback (or the normal CSI report), the data received by the UE inevitably has relatively low transmission efficiency. That is, although the semi-OL MIMO scheme is used for high transmission efficiency, data transmission/reception between the eNB and the UE may have low transmission efficiency. Therefore, a multi-CSI feedback (or a multi-CSI report) is needed for the semi-OL MIMO scheme with high transmission efficiency.

Figure 4:
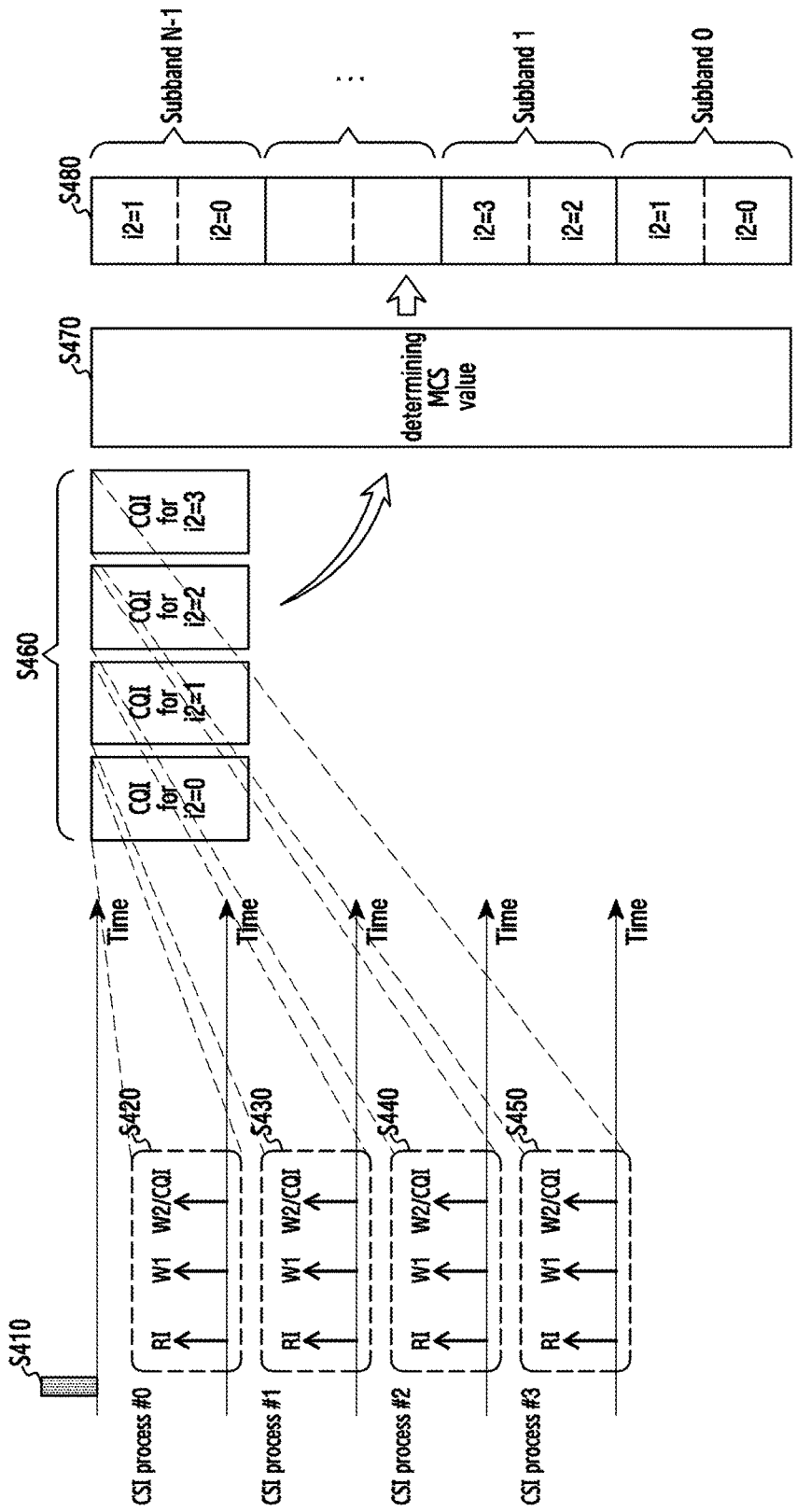
FIG. 4 illustrates an example of a data transceiving process according to a multi-CSI feedback according to an embodiment of the present disclosure.

FIG. 4 illustrates an example of a data transceiving process according to a multi-CSI feedback according to an embodiment of the present disclosure.

A UE mentioned in a description of FIG. 4 may be the UE 210 illustrated in FIG. 2, and an eNB mentioned in the description of FIG. 4 may be the eNB 220 illustrated in FIG. 2.

In FIG. 4, the UE may use a plurality of CSI processes for a semi-OL MIMO scheme having high transmission efficiency in an environment where a CSI report is relatively inaccurate due to a high moving speed and the like. A CSI process may be a term to indicate an operation of feeding back channel information with an independent CSI-RS resource and an independent CSI feedback configuration. One or more CSI processes may be present in one serving cell. Each of the plurality of CSI processes may have an independent CSI-RS resource and an independent feedback configuration. Each of the plurality of CSI processes may be configured, through a codebook subset restriction included in higher-layer signaling, such that the UE reports a PMI that the eNB desires to receive and a CQI as to the PMI.

Referring to FIG. 4, in operation S410, the eNB may transmit a CSI-RS to the UE in order to obtain CSI on a channel between the eNB and the UE. The UE may receive the CSI-RS transmitted from the eNB.

Different feedback configurations may be set for the plurality of CSI processes. However, the same resource configuration (periodicity and subframe offset) may be used for the transmission of the CSI-RS. For semi-OL MIMO transmission proposed in the present disclosure, each CSI process may need to report a different precoder. However, a channel necessary for channel measurement and transmission may be the same for all CSI processes.

In some embodiments, when a PMI indicating a beam group is determined to be i1=m through the foregoing procedure or the like, each of the plurality of CSI processes may be configured such that the UE reports determined i1=m, one of i2=k, i2=l, i2=m, and i2=n representing some beams in a beam group indicated by i1=m, and a CQI as to one of i2=k, i2=l, i2=m, and i2=n. For example, a zeroth CSI process may be configured such that the UE reports i1=m, i2=k and a CQI as to i2=k; a first CSI process may be configured such that the UE reports i1=m, i2=l, and a CQI as to i2=l; a second CSI process may be configured such that the UE reports i1=m, i2=m, and a CQI as to i2=m; and a third CSI process may be configured such that the UE reports i1=m, i2=n, and a CQI as to i2=n. An i2 index configuration may vary depending on an efficient precoder cycling method (for example, entire i2 cycling, quantized co-phasing fixing and beam cycling, and beam fixing and quantized co-phasing cycling) determined by the eNB, the number of CSI processes supportable by the UE, or the like. For example, when the UE supports four CSI processes and co-phasing cycling is performed with a first beam in a beam group fixed, i2 may separately be set to 0/1/2/3.

In other embodiments, each of the plurality of CSI processes may be configured such that the UE reports i1 having a designated range, one of i2 values having a designated value, and a CQI as to one of the i2 values. For example, a zeroth CSI process may be configured such that the UE reports i1 ranging from 0 to n (for example, n may be set to 1023), i2=k, and a CQI as to i2=k; a first CSI process may be configured such that the UE reports i1 ranging from 0 to n, i2=k+1, and a CQI as to i2=k+1; a second CSI process may be configured such that the UE reports i1 ranging from 0 to n, i2=k+2, and a CQI as to i2=k+2; and a third CSI process may be configured such that the UE reports i1 ranging from 0 to n, i2=k+3, and a CQI as to i2=k+3.

In operation S420, the UE may transmit, to the eNB, a CSI feedback that includes RI information, information on a PMI (W1) indicating a beam group, a PMI (W2) indicating a specific beam in the beam group, and information (W2/CQI) on a CQI as to the PMI indicating the specific beam and corresponds to a zeroth CSI process. For example, W1 may indicate i1=1, and W2/CQI may indicate i2=0 and CQI information on i2=0. For another example, W1 may indicate i1 selected from 0 to 1023, and W2/CQI may indicate i2=0 and CQI information on i2=0.

In operation S430, the UE may transmit, to the eNB, a CSI feedback that includes RI information, information on a PMI (W1) indicating a beam group, a PMI (W2) indicating a specific beam in the beam group, and information (W2/CQI) on a CQI as to the PMI indicating the specific beam and corresponds to a first CSI process. For example, W1 may indicate i1=1, and W2/CQI may indicate i2=1 and CQI information on i2=1. For another example, W1 may indicate i1 selected from 0 to 1023, and W2/CQI may indicate i2=1 and CQI information on i2=1.

In operation S440, the UE may transmit, to the eNB, a CSI feedback that includes RI information, information on a PMI (W1) indicating a beam group, a PMI (W2) indicating a specific beam in the beam group, and information (W2/CQI) on a CQI as to the PMI indicating the specific beam and corresponds to a second CSI process. For example, W1 may indicate i1=1, and W2/CQI may indicate i2=2 and CQI information on i2=2. For another example, W1 may indicate i1 selected from 0 to 1023, and W2/CQI may indicate i2=2 and CQI information on i2=2.

In operation S450, the UE may transmit, to the eNB, a CSI feedback that includes RI information, information on a PMI (W1) indicating a beam group, a PMI (W2) indicating a specific beam in the beam group, and information (W2/CQI) on a CQI as to the PMI indicating the specific beam and corresponds to a third CSI process. For example, W1 may indicate i1=1, and W2/CQI may indicate i2=3 and CQI information on i2=3. For another example, W1 may indicate i1 selected from 0 to 1023, and W2/CQI may indicate i2=3 and CQI information on i2=3.

Although FIG. 4 illustrates the CSI feedback for wideband reporting in operations S420 to S450, it should be noted that these CSI feedback may also be used for subband reporting. In addition, while the above example is based on periodic channel state reporting, various embodiments of the present disclosure may be used in aperiodic channel state reporting as well as in periodic channel state reporting.

Further, since the entire band has a common RI configuration for one transmission in LTE, it may be preferable that the CSI feedback each have common RI information for semi-OL MIMO transmission. To this end, an RI reference CSI process may be established through higher-layer signaling, thereby allowing the CSI feedback to report CSI based on common RI information. The RI reference CSI process may be a configuration for reporting a channel state, assuming the same RI for a plurality of CSI processes.

In operation S460, the eNB may receive a plurality of CSI feedback respectively corresponding to the zeroth CSI process to the third CSI process from the UE. The plurality of CSI feedback may be collectively referred to as a multi-CSI feedback.

In some embodiments, the plurality of CSI feedback received by the eNB may respectively include i2=0 to i2=3 and the CQI information on i2=0 to the CQI information on i2=3 for each subband. Therefore, the eNB may obtain all of the CQI information on i2=0 to the CQI information on i2=3 used for precoder cycling in subband 0 to subband N−1.

In operation S470, the eNB may determine an MCS value for data to be transmitted based on the received multi-CSI feedback. Since the received multi-CSI feedback includes all PMIs and CQI information on the PMIs that are used for precoder cycling in each subband, the eNB may determine the MCS value so that the data to be transmitted has high transmission efficiency.

In operation S480, the eNB may transmit data modulated based on the determined MCS value to the UE through precoder cycling. The eNB may transmit the data modulated based on the determined MCS value to the UE through precoder cycling defined for each designated unit. For example, the designated unit may be an RE, a PRB, a PRG, a subband, or the like.

FIG. 4 shows an example of a multi-CSI feedback including four CSI processes. However, this example is provided for illustrative purposes, and the number of CSI processes forming the multi-CSI feedback may vary depending on the number of precoders used in precoder cycling. In some embodiments, when three beams are used for precoder cycling, the number of CSI processes may be three. In other embodiments, when eight precoders are used for precoder cycling, a subframe subset may be set through higher-layer signaling in addition to the CSI processes.

As described above, in the semi-OL MIMO system, the UE and the eNB may perform data transmission/reception with high transmission efficiency through the multi-CSI feedback. The eNB may obtain CQI information on beams used for precoder cycling per designated unit through the reception of the multi-CSI feedback. Since the eNB may determine an MCS value for data corresponding to one modulation unit based on the explicit CQI information obtained per designated unit, the eNB may perform data transmission with high transmission efficiency.

Figure 5:
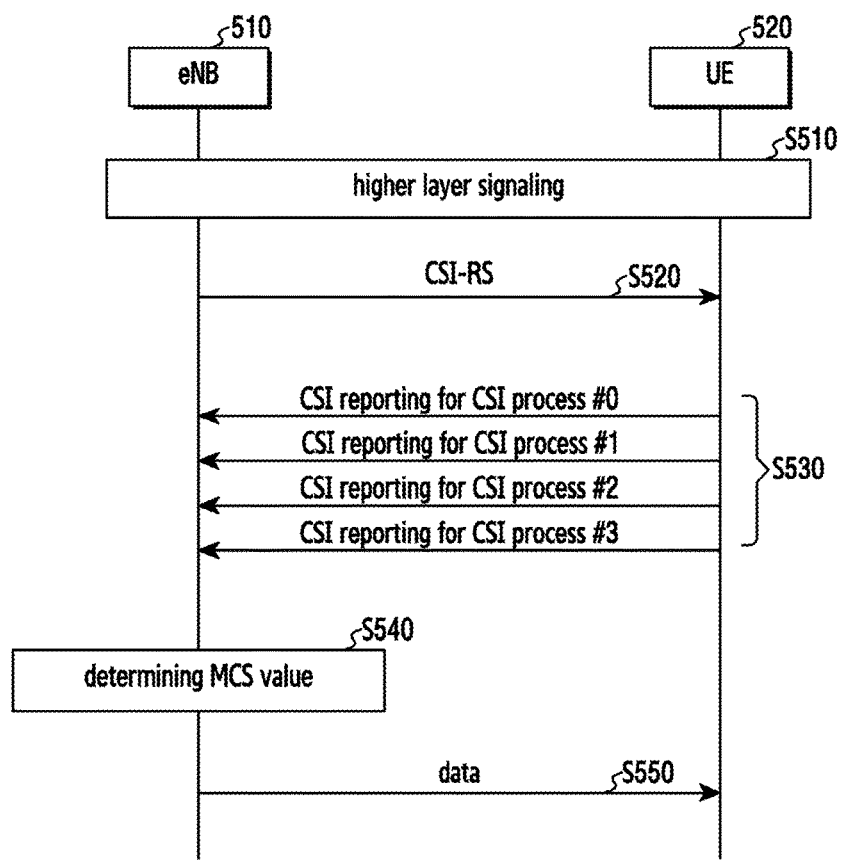
FIG. 5 illustrates an example of signal flow between an evolved node B (eNB) and a user equipment (UE) with respect to a multi-CSI feedback according to an embodiment of the present disclosure.

FIG. 5 illustrates an example of signal flow between an eNB and a UE with respect to a multi-CSI feedback according to an embodiment of the present disclosure.

A UE mentioned in a description of FIG. 5 may be the UE 210 illustrated in FIG. 2, and an eNB mentioned in the description of FIG. 5 may be the eNB 220 illustrated in FIG. 2.

Referring to FIG. 5, in operation S510, the eNB 510 and the UE 520 may perform higher-layer signaling.

For example, the eNB 510 may transmit configuration information related to a CSI-RS used for a CSI feedback (or report) to the UE through a radio resource control (RRC) message (or RRC signaling). The configuration information related to the CSI-RS may include the transmission periodicity (or a duty cycle) of the CSI-RS, the number of CSI-RS, the number of antennas per dimension (for example, N1 and N2), oversampling factor O1 and O2 per dimension, a codebook subset restriction, a CSI-RS pattern index, a CSI process index, CSI-RS transmit power information, a plurality of resource configurations for setting one subframe configuration and a position for transmitting a plurality of CSI-RSs, and the like.

For another example, the eNB 510 may transmit configuration information for a multi-CSI feedback to the UE through an RRC message. In the configuration information for the multi-CSI feedback, PMI/CQI periodicity and offset, RI periodicity and offset, a WB/SB, a submode, and the like may be set.

In particular, the UE 520 may obtain information on each of CSI processes forming the multi-CSI feedback through the procedure of operation S510. For example, the UE 520 may obtain information on a PMI to be reported by the UE 520 through each of the CSI processes.

For instance, each of the CSI processes forming the multi-CSI feedback may be set as shown in Table 3 below.

TABLE 3

| CSI process index | i1 index | i2 index (layer = 1) |
|---|---|---|
| 0 | 0 | 0 |
| 1 | 0 | 1 |
| 2 | 0 | 2 |
| 3 | 0 | 3 |

In Table 3, the CSI process index is a parameter for identifying a CSI process, the i1 index is a parameter indicating i1 to be restricted in the CSI process, the i2 index is a parameter indicating i2 to be restricted in the CSI process. Table 3 may be an example in a case where i1 to be restricted is determined as 0. A process for determining i1 to be restricted will be described below in FIGS. 7A and 7B.

According to Table 3, a CSI process having CSI process index 0 (zeroth CSI process) is configured such that the UE 520 reports a CQI as to i1 having a value of 0 and i2 having a value of 0; a CSI process having CSI process index 1 (first CSI process) is configured such that the UE 520 reports a CQI as to i1 having a value of 0 and i2 having a value of 1; a CSI process having CSI process index 2 (second CSI process) is configured such that the UE 520 reports a CQI as to i1 having a value of 0 and i2 having a value of 2; and a CSI process having CSI process index 3 (third CSI process) is configured such that the UE 520 reports a CQI as to i1 having a value of 0 and i2 having a value of 3. The indices of 0, 1, 2, and 3 allowed to report i2 are for illustrative purposes and may vary depending on a precoder cycling method (for example, quantized co-phasing fixing and beam cycling, beam fixing and quantized co-phasing cycling, and the like) determined to be efficient by the eNB.

In operation S520, the eNB 510 may transmit a CSI-RS to the UE 520. The UE 520 may receive the CSI-RS transmitted from the eNB 510. In the CSI processes, there may be a plurality of CSI-RS configurations, but the CSI-RS may be a common configuration to the plurality of CSI processes. In the present disclosure, CSI needed for transmission according to the semi-OL MIMO scheme requires different PMI assumptions and reports. However, a CSI-RS needed for channel measurement may not need to vary in each of the plurality of CSI processes, and thus the plurality of CSI processes may share a single configuration, thereby minimizing overheads needed for CSI-RS transmission and improving system performance. The UE 520 may estimate channel information for each antenna port based on the received CSI-RS. The UE 520 may estimate an additional channel for a virtual resource based on the estimated channel information for each antenna port. When this operation is completed, the UE 520 may determine to perform a CSI feedback to the eNB 510. In response to determining to perform the CSI feedback, the UE 520 may generate a PMI, an RI, and a CQI.

In operation S530, the UE 520 may transmit, to the eNB 510, a plurality of CSI reports respectively corresponding to the plurality of CSI processes. That is, the UE 520 may transmit a multi-CSI report to the eNB 510. For example, the UE 520 may transmit a CSI report for the zeroth CSI process, a CSI report for the first CSI process, a CSI report for the second CSI process, and a CSI report for the third CSI process. Although four CSI processes are illustrated in operation S530, the number of CSI processes for reporting CSI may vary. In operation S530, not only the CSI processes but also a subframe subset may be used to report a plurality of CSIs by using a different codebook subset restriction.

According to embodiments, the transmitted CSI reports may each include different pieces of information. For example, as illustrated above in Table 3, each of the transmitted CSI reports may include information on fixed i1 and i2 designated for each CSI report. For another example, as illustrated below in Table 4, each of the transmitted CSI reports may include information on i1 within a designated range and i2 designated for each CSI report.

The CSI reports may each have independent RI information or may have the same RI information. It may be set through the aforementioned RI reference CSI process whether RI information included in each CSI report is independent.

In operation S540, the eNB 510 may determine an MCS value for data to be transmitted based on the received multi-CSI feedback. The received multi-CSI report includes all information on a precoder used for precoder cycling. For example, when the precoder used for precoder cycling has an index of i1=1 and indexes of i2=0, i2=2, i2=4 and i2=6, the CSI report for the zeroth CSI process, which forms the received multi-CSI report, may include i1=1, i2=0, and CQI information on i2=0; the CSI report for the first CSI process, which forms the received multi-CSI report, may include i=−1, i2=2, and CQI information on i2=2; the CSI report for the second CSI process, which forms the received multi-CSI report, may include i1=1, i2=4, and CQI information on i2=4; and the CSI report for the third CSI process, which forms the received multi-CSI report, may include i1=1, i2=6, and CQI information on i2=6. Since the eNB 510 obtains all CQI information on the indexes of beams used for precoder cycling, the eNB 510 may determine the MCS value so that data may be transmitted with high transmission efficiency.

The precoder information used for precoder cycling may vary per rank. For example, when i2 is restricted in four CSI processes, the processes may be configured such that i2=0, 1, 2, and 3 are reported when rank=1, and i2=0, 1, 4, and 5 are reported when rank=2.

In operation S550, the eNB 510 may transmit data modulated based on the determined MCS value to the UE 520 using precoder cycling. That is, the eNB 510 may transmit the data modulated based on the determined MCS value to the UE 520 through the semi-OL MIMO scheme. The UE 520 may receive data modulated with an optimized MCS value for the semi-OL MIMO scheme from the eNB 510. That is, a semi-OL MIMO system including the eNB 510 and the UE 520 may cover for dynamic interference or high-speed movements of the UE 520 with less overheads than the CL MIMO system.

As described above, the semi-OL MIMO scheme may compensate weak points of the CL MIMO scheme and weak points of the OL MIMO scheme by using approximate direction information on the UE and precoder cycling. Here, the approximate direction information on the UE may be determined through various methods. For example, the approximate direction information on the UE may be determined through a PMI indicating one beam group (for example, i1) among a plurality of beam groups. Accordingly, various embodiments according to whether to restrict the PMI indicating the one beam group will be described below.

Figure 6:
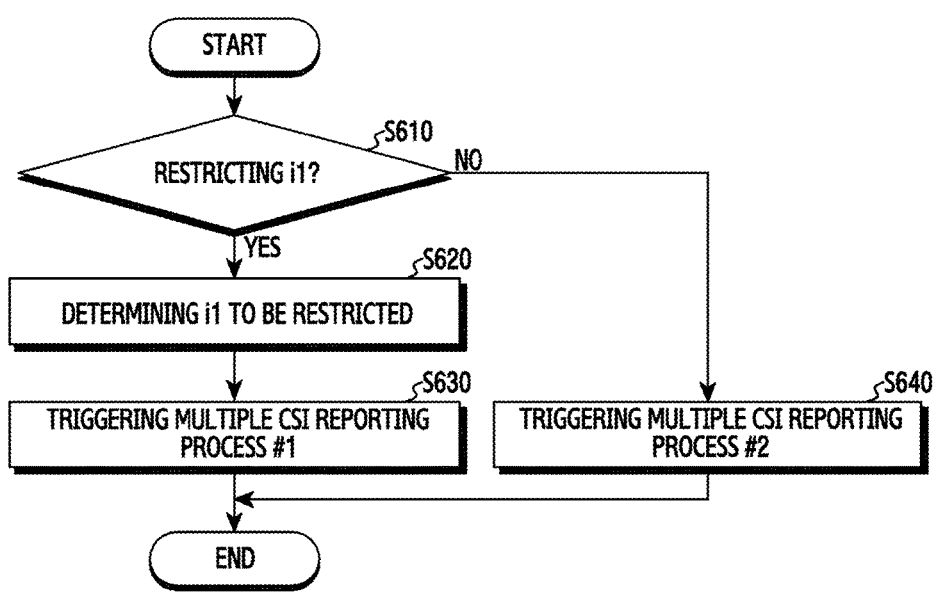
FIG. 6 illustrates an example of a multi-CSI report process depending on whether to restrict an index indicating a beam group according to an embodiment of the present disclosure.

FIG. 6 illustrates an example of a multi-CSI report process depending on whether to restrict an index indicating a beam group according to an embodiment of the present disclosure.

A UE mentioned in a description of FIG. 6 may be the UE 210 illustrated in FIG. 2, and an eNB mentioned in the description of FIG. 6 may be the eNB 220 illustrated in FIG. 2.

Referring to FIG. 6, in operation S610, the eNB may determine whether to restrict a PMI indicating a beam group (hereinafter, i1) for a multi-CSI report process for the semi-OL MIMO scheme. When the eNB desires to obtain information on i1, which is a parameter indicating approximate direction information on the UE, through an independent procedure, and then to start (or trigger) the multi-CSI report process, the eNB may perform operation S620. Alternatively, when the eNB desires to perform a procedure for obtaining information on i1, which is a parameter indicating approximate direction information on the UE, and a multi-CSI report process through one procedure, the eNB performs operation S640.

In operation S620, the eNB may determine i1 to be restricted. For example, the eNB may determine i1 to be restricted through an independent procedure of the multi-CSI report process. In some embodiments, the eNB may determine i1 to be restricted based on an uplink reference signal transmitted from the UE. In other embodiments, the eNB may determine i1 to be restricted via a codebook subset restriction and a single CSI process.

In operation S630, the eNB may trigger a first multi-CSI report process based on determined i1. For example, the eNB may set a CSI process for restricting some beams included in a beam group indicated by determined i1 through a codebook subset restriction in order to trigger the first multi-CSI report process. For another example, the eNB may set, with the UE, the transmission periodicity and the transmission offset of each of CSI reports forming a first multi-CSI report to the UE, in order to trigger the first multi-CSI report process. The first multi-CSI report process may allow the UE to report different i2 for each CSI process based on the same i1.

In operation S640, the eNB may trigger a second multi-CSI report process capable of restricting i1 through one procedure. For example, the eNB may set a CSI process for restricting i1 and i2 through a codebook subset restriction in order to trigger the second multi-CSI report process. In the second multi-CSI report process, the UE reports different i2 based on different i1. However, when characteristics of a long-term channel between the eNB and the UE change, no RRC re-establishment may be required.

Figure 7A:
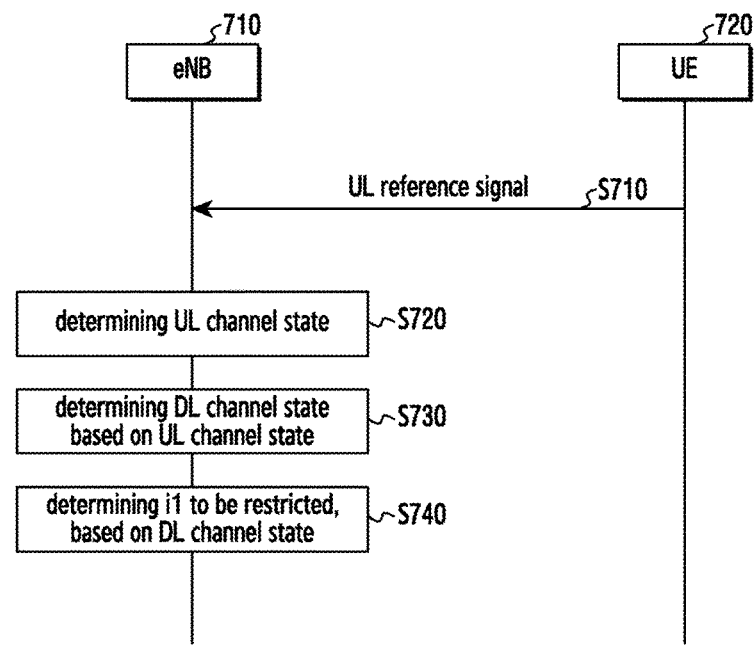
FIG. 7A illustrates an example of signal flow between an eNB and a UE to determine a precoding matrix index (PMI) to be restricted according to an embodiment of the present disclosure.

FIG. 7A illustrates an example of signal flow between an eNB and a UE to determine a PMI to be restricted according to an embodiment of the present disclosure.

A UE mentioned in a description of FIG. 7A may be the UE 210 illustrated in FIG. 2, and an eNB mentioned in the description of FIG. 7A may be the eNB 220 illustrated in FIG. 2.

Referring to FIG. 7A, in operation S710, the UE 720 may transmit an uplink reference signal to the eNB 710. For example, the uplink reference signal may be a sounding reference signal (SRS). The eNB 710 may receive the uplink reference signal from the UE 720.

In operation S720, the eNB 710 may determine the state of an uplink channel between the eNB 710 and the UE 720 based on the received uplink reference signal. The eNB 710 may determine the state of the uplink channel between the eNB 710 and the UE 720 in order to determine the state of a downlink channel between the eNB 710 and the UE 720. For example, since a TDD system performs uplink transmission and downlink transmission in the same frequency band (that is, the TDD system has channel reciprocity), the eNB 710 may determine the state of the downlink channel based on the state of the uplink channel. For another example, when an uplink band and a downlink band are contiguous in an FDD system, since the uplink channel and the downlink channel have channel reciprocity, the eNB 710 may determine the state of the downlink channel based on the state of the uplink channel.

In operation S730, the eNB 710 may determine the state of the downlink channel based on the determined state of the uplink channel.

In operation S740, the eNB 710 may determine i1 to be restricted based on the determined state of the downlink channel. For example, the eNB 710 may determine information on an approximate direction of the UE based on the determined state of the downlink channel. The eNB 710 may determine a PMI corresponding to the determined approximate direction as i1 to be restricted.

Figure 7B:
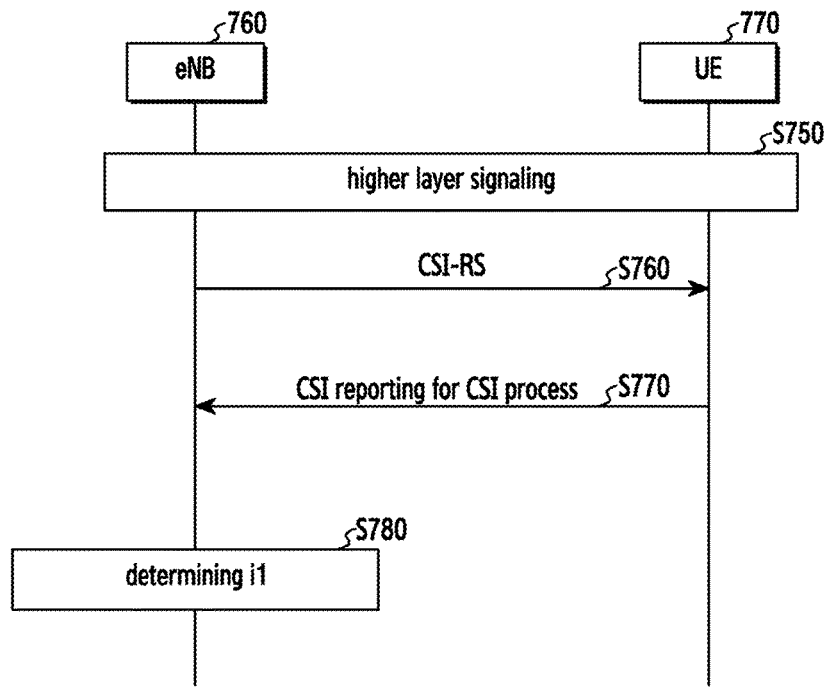
FIG. 7B illustrates another example of signal flow between an eNB and a UE to determine a PMI to be restricted according to an embodiment of the present disclosure.

FIG. 7B illustrates another example of signal flow between an eNB and a UE to determine a PMI to be restricted according to an embodiment of the present disclosure.

A UE mentioned in a description of FIG. 7B may be the UE 210 illustrated in FIG. 2, and an eNB mentioned in the description of FIG. 7B may be the eNB 220 illustrated in FIG. 2.

Referring to FIG. 7B, in operation S750, the eNB 760 and the UE 770 may perform higher-layer signaling. In some embodiments, the eNB 760 may configure a CSI process through a codebook subset restriction. The CSI process may be configured such that the UE reports specified PMI indices. For example, the CSI process may be configured as below in Table 4.

TABLE 4

| CSI process index | i1 index | i2 index (layer = 1) |
|---|---|---|
| 0 | 0-1023 | 0 |

In Table 4, the CSI process index is a parameter for identifying a CSI process, the i1 index is a parameter indicating i1 to be restricted in the CSI process, the i2 index is a parameter indicating i2 to be restricted in the CSI process. In Table 4, a CSI process with a CSI process index of 0 may be a CSI process configured such that the UE 770 reports a CQI as to i1 ranging from 0 to 1023 and i2=0.

Although Table 4 shows i1 ranging from 0 to 1023, it should be noted that the range of i1 may be variously set (different CSI-RS port numbers, N1/N2, O1/O2, and the like) depending on embodiments.

In operation S760, the eNB 760 may transmit a CSI-RS to the UE 770. The UE 770 may receive the CSI-RS from the eNB 760. The UE 770 may generate a CSI report corresponding to the CSI process indicated by the CSI process index of 0 based on the received CSI-RS. The generated CSI report may include CQI information on each of i1=0 to i1=1023 and i2=0. In addition, the generated CSI report may include RI information.

In operation S770, the UE 770 may transmit the generated CSI report for the CSI process to the eNB 760. The eNB 760 may receive the CSI report from the UE 770.

In operation S780, the eNB 760 may determine an approximate direction of the UE 770 based on the received CSI report. Since the received CSI report includes the CQI information for each of i1=0 to i1=1023 and i2=0, the eNB 760 may determine a PMI indicating the approximate direction of the UE 770 as i1 to be restricted. For example, a CQI as to i1=k is determined to be the best among the CQI information on each of i1=0 to i1=1023, the eNB 760 may determine i1=k as a PMI to be restricted.

Figure 8:
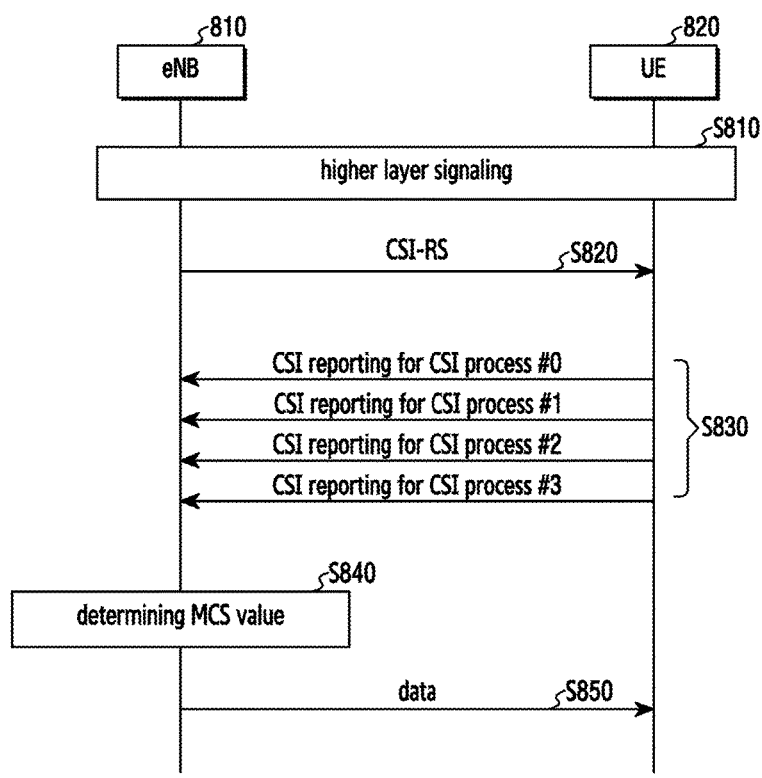
FIG. 8 illustrates an example of signal flow between a UE and an eNB performing a multi-CSI report process with i1 not restricted according to an embodiment of the present disclosure.

FIG. 8 illustrates an example of signal flow between a UE and an eNB performing a multi-CSI report process with i1 not restricted according to an embodiment of the present disclosure.

A UE mentioned in a description of FIG. 8 may be the UE 210 illustrated in FIG. 2, and an eNB mentioned in the description of FIG. 8 may be the eNB 220 illustrated in FIG. 2.

Referring to FIG. 8, in operation S810, the eNB 810 and the UE 820 may perform higher-layer signaling.

For example, the eNB 810 may transmit configuration information related to a CSI-RS used for a CSI report to the UE 820 through an RRC message. For another example, the eNB 810 may transmit configuration information for a multi-CSI feedback to the UE 820 through an RRC message.

Through operation S810, the UE 820 may obtain information on each of CSI processes forming a multi-CSI report. For example, the UE 820 may obtain information on a PMI to be reported by the UE 820 through each of the CSI processes.

For example, each of the CSI processes forming the multi-CSI report may be configured as below in Table 5.

TABLE 5

| CSI process index | i1 index | i2 index (layer = 1) |
|---|---|---|
| 0 | 0-1023 | 0 |
| 1 | 0-1023 | 1 |
| 2 | 0-1023 | 2 |
| 3 | 0-1023 | 3 |

In Table 5, the CSI process index is a parameter for identifying a CSI process, the i1 index is a parameter indicating i1 to be restricted in the CSI process, the i2 index is a parameter indicating i2 to be restricted in the CSI process.

For example, when the eNB 810 fails to obtain information on i1 indicating an approximate direction of the UE 820, the eNB 810 needs not only a PMI report for precoder cycling but also the information on i1 indicating the approximate direction of the UE 820 and the state of a long-term channel between the UE 820 and the eNB 810.

In Table 5, in order to identify the information on i1, a CSI process having CSI process index 0 (zeroth CSI process) is configured such that the UE 820 reports a CQI as to i1 having a value ranging from 0 to 1023 and i2 having a value of 0; a CSI process having CSI process index 1 (first CSI process) is configured such that the UE 820 reports a CQI as to i1 having a value ranging from 0 to 1023 and i2 having a value of 1; a CSI process having CSI process index 2

(second CSI process) is configured such that the UE 820 reports a CQI as to i1 having a value ranging from 0 to 1023 and i2 having a value of 2; and a CSI process having CSI process index 3 (third CSI process) is configured such that the UE 820 reports a CQI as to i1 having a value ranging from 0 to 1023 and i2 having a value of 3.

Although Table 5 shows i1 ranging from 0 to 1023, it should be noted that the range of i1 may be variously set (different CSI-RS port numbers, N1/N2, O1/O2, and the like) depending on embodiments.

When the CSI processes are configured as shown in Table 5, the eNB 810 may obtain approximate direction information on the UE 820 and CQI information on each beam used for precoder cycling through a subsequent procedure (that is, a second multi-CSI report process).

In operation S820, the eNB 810 may transmit a CSI-RS to the UE 820. The configuration information related to the CSI-RS may be recognized by the UE 820 through operation S810. Therefore, the UE 820 may receive the CSI-RS from the eNB 810.

The UE 820 may generate CSI reports for the respective CSI processes based on the configuration information on the multi-CSI report set in operation S810 and the received CSI-RS. For example, a CSI report corresponding to the zeroth CSI process may include i1 having a value ranging from 0 to 1023, i2 having a value of 0, and CQI information on i2 having a value of 0; a CSI report corresponding to the first CSI process may include i1 having a value ranging from 0 to 1023, i2 having a value of 1, and CQI information on i2 having a value of 1; a CSI report corresponding to the second CSI process may include i1 having a value ranging from 0 to 1023, i2 having a value of 2, and CQI information on i2 having a value of 2; and a CSI report corresponding to the third CSI process may include i1 having a value ranging from 0 to 1023, i2 having a value of 3, and CQI information on i2 having a value of 3.

The eNB 810 may receive the CSI reports from the UE 820.

The CSI reports respectively corresponding to the zeroth to third CSI processes may have different values of i1. As shown in Table 5, since the second multi-CSI report process does not restrict i1 to one value, the CSI reports may have different values of i1. In this case, the eNB 810 may transmit data based on different i1. Further, the eNB 810 may not accurately re-estimate i1 information and i2 information needed for data transmission through the semi-OL MIMO scheme.

Thus, the eNB 810 may receive, for example, the CSI report corresponding to the first CSI process, which may include i1=k, and the CSI report corresponding to the second CSI process, which may include i1=k+2. When CSI reports having different values of i1 are received, the eNB 810 may perform the procedure described with reference to FIG. 7A or 7B and the procedure described with reference to FIG. 5, instead of performing operation S840, for the semi-OL MIMO scheme having accurate channel estimation or high transmission efficiency.

In operation S840, the eNB 810 may determine an MCS value for data to be transmitted based on the received CSI reports. Since the eNB 810 acquires CQI information on each subband and each PMI through the procedures of S810 to S830, the eNB 810 may determine an optimized MCS value for data transmission.

In operation S850, the eNB 810 may transmit data modulated based on the determined MCS value to the UE 820 through precoder cycling. For example, the data may be transmitted to the UE 820 via a Physical Downlink Shared Channel (PDSCH). The UE 820 may receive the data transmitted through precoder cycling from the eNB 810.

Figure 9:
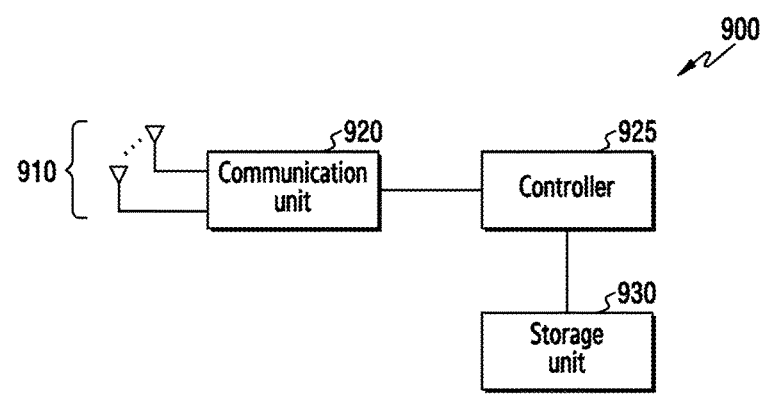
FIG. 9 illustrates an example of a functional configuration of a UE that transmits a multi-CSI report (or feedback) according to an embodiment of the present disclosure.

FIG. 9 illustrates an example of a functional configuration of a UE that transmits a multi-CSI report (or feedback) according to an embodiment of the present disclosure.

The functional configuration may be included in any one of the UEs shown in FIGS. 2 to 5 and FIGS. 7A, 7B and 8.

Referring to FIG. 9, a UE 900 may include an antenna 910, a communication unit 920, a controller 925, and a storage unit 930.

The antenna 910 may include one or more antennas. The antenna 910 may be suitably configured for an MIMO scheme.

The communication unit 920 may perform functions of transmitting or receiving a signal through a wireless channel.

The communication unit 920 may perform a function of conversion between a baseband signal and a bit string according to a physical-layer specification of a system. For example, in data transmission, the communication unit 920 may encode and modulate a transmission bit string to generate complex symbols. For another example, in data reception, the communication unit 920 may demodulate and decode a baseband signal to reconstruct a reception bit string.

The communication unit 920 may upconvert a baseband signal to a radio frequency (RF) band signal and may transmit the RF band signal through the antenna 910. The communication unit 920 may downconvert an RF band signal, which is received through the antenna 910, to a baseband signal. For example, the communication unit 920 may include a transmission filter, a reception filter, an amplifier, a mixer, an oscillator, a digital-to-analog converter (DAC), an analog digital converter (ADC), or the like.

The communication unit 920 may be operatively coupled with the controller 925.

The communication unit 920 may include at least one transceiver.

The controller 925 may control overall operations of the UE 900. For example, the controller 925 may transmit or receive a signal through the communication unit 920. The controller 925 may record data in the storage unit 930 and may read data stored in the storage unit 930. To this end, the controller 925 may include at least one processor. For example, the controller 925 may include a communication processor (CP) performing a control for communication and an application processor (AP) controlling a higher layer, such as an application program.

The controller 925 may be configured to implement the procedures and/or methods proposed in the present disclosure.

The storage unit 930 may store a control command code, control data, or user data to control the UE 900. For example, the storage unit 930 may include an application, an operating system (OS), a middleware, and a device driver.

The storage unit 930 may include at least one of a volatile memory and a non-volatile memory. The volatile memory may include a dynamic random-access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read-only memory (ROM), a programmable ROM (PROM), an electrically programmable ROM (EPROM), an electrically erasable ROM (EEPROM), a flash memory, and the like.

The storage unit 930 may include a non-volatile medium, such as a hard disk drive (HDD), a solid state disk (SSD), an embedded multi media card (eMMC), and a universal flash storage (UFS).

The storage unit 930 may be operatively coupled to the controller 925.

Figure 10:
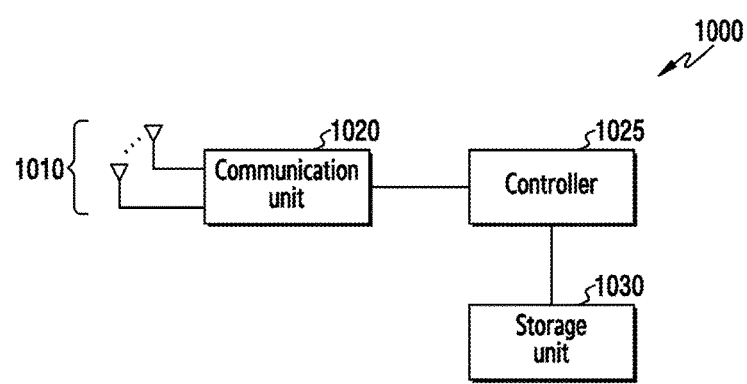
FIG. 10 illustrates an example of a functional configuration of an eNB that receives a multi-CSI report according to an embodiment of the present disclosure.

FIG. 10 illustrates an example of a functional configuration of an eNB that receives a multi-CSI report according to an embodiment of the present disclosure.

The functional configuration may be included in any one of the eNBs shown in FIGS. 2 to 6, 7A, 7B, and 8.

Referring to FIG. 10, an eNB 1000 may include an antenna 1010, a communication unit 1020, a controller 1025, and a storage unit 1030.

The antenna 1010 may include one or more antennas. The antenna 1010 may be suitably configured for an MIMO scheme.

The communication unit 1020 may perform functions of transmitting or receiving a signal through a wireless channel.

The communication unit 1020 may perform a function of conversion between a baseband signal and a bit string according to a physical-layer specification of a system. For example, in data transmission, the communication unit 1020 may encode and modulate a transmission bit string to generate complex symbols. For another example, in data reception, the communication unit 1020 may demodulate and decode a baseband signal to reconstruct a reception bit string.

The communication unit 1020 may upconvert a baseband signal to an RF band signal and may transmit the RF band signal through the antenna 1010. The communication unit 1020 may downconvert an RF band signal, which is received through the antenna 1010, to a baseband signal. For example, the communication unit 1020 may include a transmission filter, a reception filter, an amplifier, a mixer, an oscillator, a digital-to-analog converter (DAC), an analog digital converter (ADC), or the like.

The communication unit 1020 may be operatively coupled with the controller 1025.

The communication unit 1020 may include at least one transceiver.

The controller 1025 may control overall operations of the eNB 1000. For example, the controller 1025 may transmit or receive a signal through the communication unit 1020. The controller 1025 may record data in the storage unit 1030 and may read data stored in the storage unit 1030. To this end, the controller 1025 may include at least one processor. For example, the controller 1025 may include a CP performing a control for communication and an AP controlling a higher layer, such as an application program.

The controller 1025 may be configured to implement the procedures and/or methods proposed in the present disclosure.

The storage unit 1030 may store a control command code, control data, or user data to control the eNB 1000. For example, the storage unit 1030 may include an application, an Operating System (OS), a middleware, and a device driver.

The storage unit 1030 may include at least one of a volatile memory and a non-volatile memory. The volatile memory may include a Dynamic Random-Access Memory (DRAM), a Static RAM (SRAM), a Synchronous DRAM (SDRAM), a Phase-change RAM (PRAM), a Magnetic RAM (MRAM), a Resistive RAM (RRAM), a Ferroelectric RAM (FeRAM), and the like. The non-volatile memory may include a Read-Only Memory (ROM), a Programmable ROM (PROM), an Electrically Programmable ROM (EPROM), an Electrically Erasable ROM (EEPROM), a flash memory, and the like.

The storage unit 1030 may include a non-volatile medium, such as a Hard Disk Drive (HDD), a Solid State Disk (SSD), an embedded Multi Media Card (eMMC), and a Universal Flash Storage (UFS).

The storage unit 1030 may be operatively coupled to the controller 1025.

In the present disclosure, particular operations described as being performed by an eNB may be performed by an upper node than the eNB depending on embodiments. That is, it would be apparent that various operations implemented for communication with a UE in a network including a plurality of network nodes including an eNB may be performed by the eNB or network nodes other than the eNB.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a ROM, an EEPROM, a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an evolved node B (eNB) in a wireless environment, the method comprising:
   receiving, from a user equipment (UE), a plurality of channel state information (CSI) feedback respectively corresponding to a plurality of CSI processes that are respectively allocated a plurality of precoding matrix indexes (PMIs), the plurality of CSI feedback each comprising information on a channel quality indication (CQI) as to a PMI allocated to a CSI process corresponding to each of the plurality of CSI feedback;
   determining a modulation and coding scheme (MCS) value based on the plurality of received CSI feedback including information on CQIs for all of the plurality of PMIs that are used for PMI cycling in each subband; and
   transmitting, to the UE, data modulated based on the determined MCS value by cyclically using the plurality of PMIs.

2. The method of claim 1, wherein the plurality of PMIs is respectively allocated to the plurality of CSI processes based on a radio resource control (RRC) message comprising information on a codebook subset restriction.

3. The method of claim 1, further comprising:
   determining one first PMI among a plurality of first PMIs respectively indicating a plurality of beam groups,
   wherein the plurality of PMIs comprises some of a plurality of second PMIs respectively indicating beams comprised in a beam group indicated by the determined first PMI.

4. The method of claim 3, wherein the determining of the one first PMI comprises:
   determining a state of a downlink between the eNB and the UE based on an uplink reference signal received from the UE when the eNB operates in a time division duplex (TDD) mode; and
   determining the one first PMI among the plurality of first PMIs based on the determined state of the downlink.

5. The method of claim 3,
   wherein the determining of the one first PMI comprises:
      receiving, from the UE, a plurality of different CSI feedback respectively corresponding to a plurality of different CSI processes that are respectively allocated the plurality of first PMIs; and
      determining the one first PMI among the plurality of first PMIs based on the plurality of received different CSI feedback,
   wherein the plurality of different CSI feedback each comprises information on a CQI as to the one first PMI allocated to a different CSI process corresponding to each of the plurality of different CSI feedback.

6. The method of claim 1, further comprising:
   transmitting a CSI reference signal (CSI-RS) to the UE,
   wherein each of the plurality of CSI feedback is generated based on the CSI-RS.

7. The method of claim 1,
   wherein the transmitting of the data modulated based on the determined MCS value to the UE comprises transmitting, to the UE, the data modulated based on the determined MCS value by cyclically using the plurality of PMIs based on a designated device, and
   wherein the designated device is set to one of a physical resource block (PRB) or a precoding resource block group (PRG).

8. An apparatus of an evolved node B (eNB) in a wireless environment, the apparatus comprising:
   at least one processor; and
   at least one transceiver configured to be operatively coupled to the at least one processor,
   wherein the at least one processor is configured to:
      receive, from a user equipment (UE), a plurality of channel state information (CSI) feedback respectively corresponding to a plurality of CSI processes that are respectively allocated a plurality of precoding matrix indexes (PMIs), the plurality of CSI feedback each comprising information on a channel quality indication (CQI) as to a PMI allocated to a CSI process corresponding to each of the plurality of CSI feedback,
      determine a modulation and coding scheme (MCS) value based on the plurality of received CSI feedback including information on CQIs for all of the plurality of PMIs that are used for PMI cycling in each subband, and
      transmit, to the UE, data modulated based on the determined MCS value by cyclically using the plurality of PMIs.

9. The apparatus of claim 8, wherein the plurality of PMIs is respectively allocated to the plurality of CSI processes based on a radio resource control (RRC) message comprising information on a codebook subset restriction.

10. The apparatus of claim 8,
    wherein the at least one processor is further configured to determine one first PMI among a plurality of first PMIs respectively indicating a plurality of beam groups, and
    wherein the plurality of PMIs comprises some of a plurality of second PMIs respectively indicating beams comprised in a beam group indicated by the determined first PMI.

11. The apparatus of claim 10, wherein the at least one processor is further configured to:
    determine a state of a downlink between the eNB and the UE based on an uplink reference signal received from the UE when the eNB operates in a time division duplex (TDD) mode, and
    determine the one first PMI among the plurality of first PMIs based on the determined state of the downlink.

12. The apparatus of claim 10,
    wherein the at least one processor is further configured to:
       receive, from the UE, a plurality of different CSI feedback respectively corresponding to a plurality of different CSI processes that are respectively allocated the plurality of first PMIs, and
       determine the one first PMI among the plurality of first PMIs based on the plurality of received different CSI feedback, and
    wherein the plurality of different CSI feedback each comprises information on a CQI as to the one first PMI allocated to a different CSI process corresponding to each of the plurality of different CSI feedback.

13. The apparatus of claim 8,
    wherein the at least one processor is further configured to transmit a CSI reference signal (CSI-RS) to the UE, and
    wherein each of the plurality of CSI feedback is generated based on the CSI-RS.

14. The apparatus of claim 8,
    wherein the at least one processor is further configured to transmit, to the UE, the data modulated based on the determined MCS value by cyclically using the plurality of PMIs based on a designated device, and wherein the designated device is set to one of a physical resource block (PRB) and a recoding resource block group (PRG).

15. An apparatus of a user equipment (UE) in a wireless environment, the apparatus comprising:
at least one processor; and
at least one transceiver configured to be operatively coupled to the at least one processor,
wherein the at least one processor is configured to:
transmit, to an evolved node B (eNB), a plurality of channel state information (CSI) feedback respectively corresponding to a plurality of CSI processes that are respectively allocated a plurality of precoding matrix indexes (PMIs), the plurality of CSI feedback each comprising information on a channel quality indication (CQI) as to a PMI allocated to a CSI process corresponding to each of the plurality of CSI feedback, and
receive, from the eNB, data transmitted by cyclically using the plurality of PMIs, and
wherein the data transmitted from the eNB is modulated based on a modulation and coding scheme (MCS) value determined based on the plurality of CSI feedback including information on CQIs for all of the plurality of PMIs that are used for PMI cycling in each subband.

16. The apparatus of claim 15, wherein the plurality of PMIs is respectively allocated to the plurality of CSI processes based on a radio resource control (RRC) message comprising information on a codebook subset restriction.

17. The apparatus of claim 15, wherein the plurality of PMIs comprises some of a plurality of second PMIs respectively indicating beams comprised in a beam group indicated by one first PMI determined among a plurality of first PMIs respectively indicating a plurality of beam groups.

18. The apparatus of claim 17,
wherein the at least one processor is further configured to transmit, to the eNB, a plurality of different CSI feedback respectively corresponding to a plurality of different CSI processes that are respectively allocated the plurality of first PMIs,
wherein the plurality of transmitted different CSI feedback each comprises information on a CQI as to the first PMI allocated to a different CSI process corresponding to each of the plurality of different CSI feedback, and
wherein the determined first PMI is determined among the plurality of first PMIs based on the plurality of different CSI feedback.

19. The apparatus of claim 15,
wherein the at least one processor is further configured to:
receive configuration information on a CSI reference signal (CSI-RS) from the eNB, and
receive a CSI-RS from the eNB based on the received configuration information on the CSI-RS, and
wherein each of the plurality of CSI feedback is generated based on the CSI-RS.

20. The apparatus of claim 15,
wherein the data transmitted from the eNB is received by the UE by cyclically using the plurality of PMIs based on a designated device, and
wherein the designated device is set to one of a physical resource block (PRB) or a precoding resource block group (PRG).

* * * * *